No. 737,014.

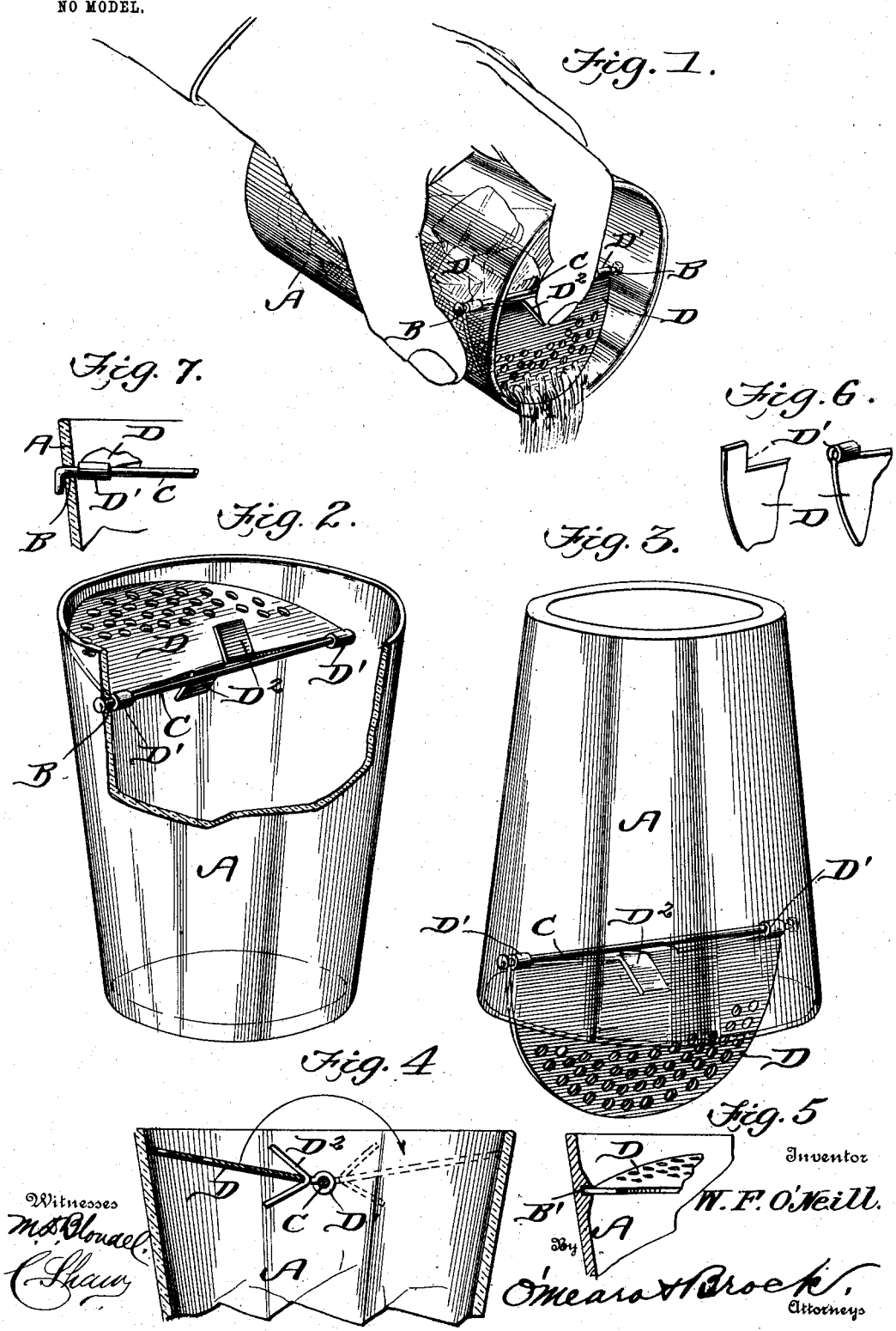

Patented August 25, 1903.

UNITED STATES PATENT OFFICE.

WILLIAM F. O'NEILL, OF BOSTON, MASSACHUSETTS, ASSIGNOR TO GEORGE J. WILKINSON, JOSEPH H. KENNEY, JOHN J. O'NEILL, AND ANNIE O'NEILL, OF BOSTON, MASSACHUSETTS.

LIQUID STRAINER AND MIXER.

SPECIFICATION forming part of Letters Patent No. 737,014, dated August 25, 1903.

Application filed October 4, 1902. Serial No. 126,002. (No model.)

*To all whom it may concern:*

Be it known that I, WILLIAM F. O'NEILL, a citizen of the United States, residing at Boston, in the county of Suffolk and State of Massachusetts, have invented a new and useful Liquid Strainer and Mixer, of which the following is a specification.

This invention is a combination mixer and strainer, the object being to provide a simple and efficient device which can be attached to a bar-glass or other form of glass vessel in which the drinks are mixed for the purpose of straining the drink when poured from the glass or vessel into the glasses in which the drinks are served.

Another object of the invention is to provide an attachment which remains in the glass both during the mixing and straining operation and in the proper position when the glass is tilted to strain the contents from the mixing-glass into the receptacles in which the drinks are served; and a further object of my invention is to provide a suitable arrangement upon the strainer by which the said strainer may be firmly held in position when the glass is tilted.

Still another object of my invention is to provide a strainer that will in no way interfere with or prevent the ingredients from being emptied from the glass after the drink has been poured out.

With these objects in view the invention consists, essentially, in the employment of a strainer-plate hingedly retained within a glass and freely movable from right to left therein, whereby the liquid can be poured and strained from either side of the glass; and the invention consists also in certain details of construction and novelties of combination, as will be fully described hereinafter and pointed out in the claims, reference being had to the drawings, in which—

Figure 1 is a perspective view illustrating the practical application of my invention. Fig. 2 is a perspective view of a glass with my improved strainer held therein and showing the position of the strainer when the ingredients are being mixed in the glass, part of the glass being broken away. Fig. 3 is a perspective view illustrating the position of my improvement when the glass is held in an inverted position to empty the ingredients after the liquid has been poured off. Fig. 4 is a detail section of a glass, illustrating the positions of the strainer; and Fig. 5 is a detail section showing a slight modification. Figs. 6 and 7 are detail views.

In carrying out my invention I employ an ordinary bar-glass A, and adjacent to the top of same and at diametrically opposite points are bored small holes B, through which a wire C passes, one end of the wire being provided with a head and its opposite end threaded to receive a nut by which the wire is positively held in place. Supported upon the wire C, within the glass, is the perforated strainer-plate D, essentially semicircular in shape and provided with eyes D' at each end, through which the wire passes. These eyes are preferably formed by rolling the ends of the plate, and for that purpose the said ends of the plate are extended slightly, as shown most clearly in Fig. 6 of the drawings. In practice I may employ a wire of sufficient length to pass entirely through the glass and have their ends bent at right angles in order to prevent dislocation, this construction being shown in detail in Fig. 7 of the drawings. If desired, the sides of the glass instead of being bored entirely through may be provided with recesses B', as shown in Fig. 5, and the ends of the wire sprung into said recesses, the wire being made of such length as to properly fit within the recesses, and in this construction of glass the strainer-plate could be made with laterally-projecting pintles, which could be sprung into the recesses, as also shown in Fig. 5 of the drawings.

The plate D is provided centrally with two oppositely-projecting finger portions $D^2$, which are adapted for engagement by one's finger when the glass is tilted to positively hold the strainer in position.

After the liquid has been mixed and is ready to be poured from the glass the attendant grasps the glass so that the index-finger will extend across the top and engage the forwardly-projecting finger portion $D^2$ of the strainer. The glass is then tilted, when the liquid will readily flow through the strainer into the glass in which the drink is served, and after the liquid has been thus poured off the remaining ingredients may be emptied by catching hold of the bottom of the glass and holding it in an inverted position, and it will be readily seen that by hinging the strainer and arranging it to swing outwardly it will drop of its own weight and hang in a vertical position and therefore afford no obstruction to the escape of the contents of the glass. Further, it will be readily seen that the strainer may be readily thrown to one side or the other of the glass, which avoids the necessity of turning the glass should the strainer be upon the opposite side from which it is desired to pour the liquid.

By having a strainer arranged within a glass it is always in position for use for either mixing or straining operation, and the many advantages obtained will be readily appreciated by those skilled in the art to which my invention appertains. It is also obvious that all the parts are easily removable for cleaning the metal parts or the glass.

Having thus described my invention, what I claim as new, and desire to secure by Letters Patent, is—

1. A glass having perforations in the sides thereof adjacent to the upper end, a wire located in said perforations and extending across the glass, a semicircular strainer-plate pivotally connected to the said wire and supported within the glass, and finger portions formed upon the plate, as specified.

2. A strainer of the kind described comprising an essentially semicircular perforated plate, eyes formed upon the ends thereof, finger portions projecting from either side of the inner edge of the plate, and means for supporting the plate within the glass, as specified.

3. A strainer of the kind described, comprising a semicircular perforated plate pivotally secured within a glass and adapted to swing to either side of the glass, and oppositely-extending finger portions projecting from the straight edge of the plate.

WILLIAM F. O'NEILL.

Witnesses:
P. HOLSON,
C. A. CRAWFORD.